(12) United States Patent
Kegasawa et al.

(10) Patent No.: US 7,111,657 B2
(45) Date of Patent: Sep. 26, 2006

(54) LAMINATE PRODUCTION APPARATUS

(75) Inventors: Tadahiro Kegasawa, Fujinomiya (JP);
Ryuichi Katsumoto, Fujinomiya (JP);
Masanori Takase, Fujinomiya (JP);
Hidetoshi Okamura, Fujinomiya (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 170 days.

(21) Appl. No.: 10/790,143

(22) Filed: Mar. 2, 2004

(65) Prior Publication Data

US 2004/0163769 A1    Aug. 26, 2004

Related U.S. Application Data

(62) Division of application No. 10/071,183, filed on Feb. 11, 2002, now Pat. No. 6,896,832.

(30) Foreign Application Priority Data

Feb. 16, 2001  (JP)  ............... 2001-040616
Mar. 26, 2001  (JP)  ............... 2001-086937

(51) Int. Cl.
*B29C 65/00* (2006.01)

(52) U.S. Cl. ................. 156/498; 156/349
(58) Field of Classification Search ......... 156/498, 156/349
See application file for complete search history.

(56) References Cited

U.S. PATENT DOCUMENTS

| 3,077,428 A | 2/1963 | Heuser et al. |
| 3,470,055 A * | 9/1969 | Wade ............... 156/244.27 |
| 4,272,312 A | 6/1981 | Thompson |
| 4,348,346 A | 9/1982 | Thompson |
| 4,731,004 A | 3/1988 | Wenz, Jr. |
| 4,784,815 A | 11/1988 | Cloeren et al. |
| 4,917,844 A * | 4/1990 | Komai et al. ............... 264/85 |
| 5,009,831 A * | 4/1991 | Turi ............... 264/510 |

FOREIGN PATENT DOCUMENTS

| EP | 0 285 146 A2 | 10/1988 |
| JP | 57-207019 B1 | 12/1982 |
| JP | 61-242820 B1 | 10/1986 |
| JP | 62-13317 B1 | 1/1987 |
| JP | 63-246227 B1 | 10/1988 |

(Continued)

*Primary Examiner*—Sam Chuan Yao
*Assistant Examiner*—Barbara J. Musser
(74) *Attorney, Agent, or Firm*—Sughrue Mion, PLLC

(57) ABSTRACT

In the resin film forming method for extruding a fused resin from an extruder die to form a resin film, the second resin forming both ends in width direction of the resin film uses a resin greater in extension viscosity than the first resin forming the center in width direction of the resin film. Thereby, even if production conditions such as resin condition and operating conditions change, faults such as neck-in and its resultant thickening at both ends of the resin film can be suppressed. In the production of a laminate by nipping a support and a resin film of a thermoplastic resin by means of a nip roller and a cooling roller while coating the resin film onto the surface of the support, the accompanying air following the rotation of the cooling roller to the nip point is shut off by blowing a gas permeable through the resin film from a gas jet nozzle toward the surface of the cooling roller. Thereby, the occurrence of craters can be inhibited, a laminate excellent in surface appearance can be produced and the production of a laminate effective especially at the time of a line speed rise in the laminate production is performable.

7 Claims, 6 Drawing Sheets

FOREIGN PATENT DOCUMENTS

| | | |
|---|---|---|
| JP | 64-3655 B2 | 1/1989 |
| JP | 64-64822 B1 | 3/1989 |
| JP | 4-81836 B1 | 3/1992 |
| JP | 5-33134 B1 | 5/1993 |
| JP | 5-82806 B2 | 11/1993 |
| JP | 6-91723 B1 | 4/1994 |
| JP | 6-61819 B2 | 8/1994 |
| JP | 6-214342 B1 | 8/1994 |
| JP | 8-36238 B1 | 2/1996 |

* cited by examiner

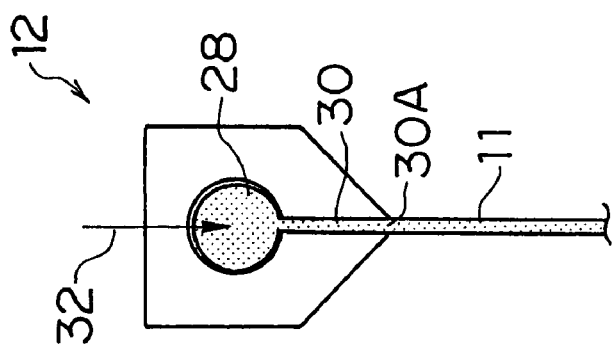
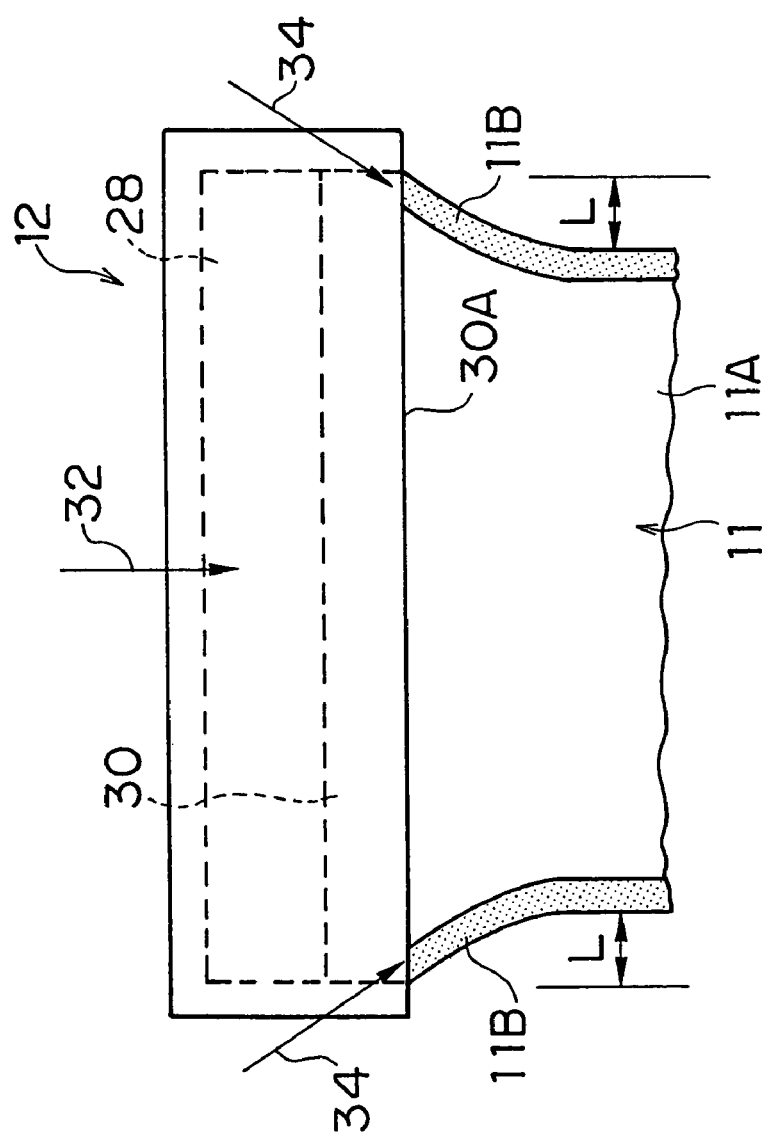
FIG.2(a)
FIG.2(b)

FIG.5

| | LINE SPEED (m/min) | MFR OF END RESIN (g/10min) | MFR RATIO OF END RESIN | EXTENSION VISCOSITY RATIO | SECTIONAL SHAPE OF RESIN FILM AT JOINING PART | NECK-IN AMOUNT OF ONE SIDE (mm) | PRESENCE OF FILM SEPARATION |
|---|---|---|---|---|---|---|---|
| COMPARATIVE EXAMPLE 1 | 200 | 10.0 | | 1.0 | Fig.3(b) | 30 | ABSENCE |
| COMPARATIVE EXAMPLE 2 | 200 | 20.0 | 2 | 1/3 | Fig.3(b) | 34 | ABSENCE |
| EXAMPLE 1 | 200 | 8.0 | 4/5 | 1.2 | Fig.3(b) | 25 | ABSENCE |
| EXAMPLE 2 | 200 | 12.0 | 1.2 | 1.2 | Fig.3(b) | 28 | ABSENCE |
| EXAMPLE 3 | 200 | 8.0 | 4/5 | 0.9 | Fig.3(b) | 29 | ABSENCE |
| EXAMPLE 4 | 420 | 2.0 | 1/5 | 10 | Fig.3(b) | 9 | ABSENCE |
| COMPARATIVE EXAMPLE 3 | 420 | 2.0 | 1/5 | 10 | Fig.3(a) | ESTIMATE DISABLE | PRESENCE |

FIG.6

| | LINE SPEED (m/min) | DISTANCE FROM NIP POINT (DEGREE) | DISTANCE FROM COOLING ROLLER (mm) | GAS WIND VELOCITY (m/s) | GAS BLOWING DIRECTION | WINDSHIELD PLATE | CRATER RESULT (PIECE) |
|---|---|---|---|---|---|---|---|
| COMPARATIVE EXAMPLE 4 | 300 | — | — | — | — | — | 350 |
| COMPARATIVE EXAMPLE 5 | 300 | 45 | 20 | 3 | NIP POINT | — | 100 |
| COMPARATIVE EXAMPLE 6 | 300 | 45 | 60 | 3 | ROLLER SURFACE | — | 200 |
| COMPARATIVE EXAMPLE 7 | 300 | 100 | 20 | 3 | ROLLER SURFACE | — | 210 |
| COMPARATIVE EXAMPLE 8 | 300 | 45 | 20 | 0.5 | ROLLER SURFACE | — | 190 |
| COMPARATIVE EXAMPLE 9 | 300 | 45 | 20 | 3 | NIP POINT | — | 250 |
| COMPARATIVE EXAMPLE 10 | 400 | 45 | 20 | 3 | NIP POINT | PRESENCE | 115 |
| EXAMPLE 5 | 300 | 45 | 20 | 3 | ROLLER SURFACE | — | 40 |
| EXAMPLE 6 | 400 | 45 | 20 | 3 | ROLLER SURFACE | — | 50 |

LAMINATE PRODUCTION APPARATUS

This is a divisional of application Ser. No. 10/071,183 filed Feb. 11, 2002 now U.S. Pat. No. 6,896,832; the disclosure of which is incorporated herein by reference.

BACKGROUND OF THE INVENTION

1. Field of the Invention

The present invention relates to a resin film forming method, to a laminate production method and apparatus and in particular to an art of suppressing a neck-in phenomenon or the like in extruding a resin from an extruder die to form a resin film and inhibiting the occurrence of craters on a resin film surface of a laminate.

2. Description of the Related Art

Generally on extruding a resin from a extruder die to form a resin film and producing a film-shaped product from this resin film or a film-shaped stack obtained by laminating or coating the resin film onto a support, a phenomenon known as so-called neck-in occurs, in which the extruded film has a width smaller than the extruding width. It is accompanied with a problem that the film thickness at both ends in width direction of the resin film becomes greater than that at the center. Furthermore, in case of forming a resin film at high speed owing to the speedup of production line, there is also a problem that a phenomenon of film shake takes place owing to the unstable both ends in width direction of the resin film and the film width is not kept constant, thereby decreasing the yield. In this case, a technique of resin edge stacking in width direction is present principally for purposes of recycling-up, but there is a problem that a film is separated between the central resin and the marginal resin of the resin film at the time of edge stacking of resins different in physical property.

Namely, in forming of a resin film by using an extruder die, there are principally (1) a problem of neck-in and its accompanying increase in thickness at both resin ends, (2) a problem of film shake and (3) a problem of film separation originating from the difference of resin in physical property between the center and both ends of a resin film and thus measures to improve these have been desired. These problems are not limited to the case of extruding a resin from an extruder die but take place also in case of ejecting a coat liquid from an extruder die.

So far, as countermeasures against the above problems, there have been adopted a method for improving the material physical property by mixing a plurality of materials (Japanese Patent Publication Nos. 64-3655 and 5-82806), a method of changing the flow of a resin in the extruder die (Japanese Patent Publication No. 6-61819 and Japanese Patent Application Publication No. 64-64822) and a method of cooling both ends of the resin film extruded from an extruder die (Japanese Patent Publication No. 5-33134).

However, the method for improving the material physical property has a drawback of deficiency in general usability because a suitable additive must be added for each material. The method of changing the flow of a resin in the extruder die by using a forming plate has a drawback of being ineffective for the film shake though effective for the suppression of neck-in. The method of cooling both ends of the resin film extruded from an extruder die has a drawback that no stable effect can be obtained in case of an increase in line speed.

Widely adopted in the production of a laminate such as support for photo printing paper is an extrusion laminate method (also referred to as an extrusion coating method) of laminating a resin film on a support by not only coating but also nipping a resin film of a thermoplastic resin such as polyolefin extruded from an extruder die to a running support for pressure adhesion at the nip point between a nip roller and a cooling roller.

In the production of this laminate, minute pores (hereinafter, referred to as craters) may appear on the surface of the resin film laminated on a support. When the number of these craters is great, the outer appearance of a product is damaged, and the glossy feeling also lowers in the case of the laminate being used as a photoprint paper support, for example, so that the product markedly decreases in value. The occurrence of craters is attributable to the fact that the accompanying air is, under influence of the accompanying air generated on the rotation of a cooling roller, accumulated in the area between the resin film and the cooling roller and a convex recess arises on the resin film. With increasing line speed in the production of a laminate, with decreasing thickness of the resin film, with lowering discharge temperature of a resin from the extruder die, with smaller nip pressure and with greater surface roughness of a support, craters become more likely to occur.

As preventive measures against the occurrence of craters, various examinations have been made, for example, from the viewpoint of a resin like Japanese Patent Application Publication No. 8-36238, from the viewpoint of an improvement in the surface of a support like Japanese Patent Application Publication No. 4-81836, on the basis of specifying the process conditions like Japanese Patent Application Publication No. 6-214342 and on the basis of proposing a new equipment for spraying a gas permeable through a resin film toward the nip point like Japanese Patent Application Publication No. 63-246227.

Though effective in its own way, however, the above-mentioned preventive measures against the occurrence of craters involved a problem that no sufficient effect could be obtained in case of a line speed rise in the production of a laminate.

In this case, the provision of a windshield plate has been proposed as a further improvement of the equipment in Japanese Patent Application Publication No. 63-246227, but is not fully effective in case of speedup to a high speed range equal to or greater than 300 m/min and a contact of the windshield plate with a cooling roller brings about a fear of damaging the cooling roller.

SUMMARY OF THE INVENTION

The present invention has been developed in view of the above-described circumstances, and has as its object the provision of a method for forming a resin film capable of suppressing the neck-in and its accompanying thickening of a resin film at both ends and suppressing the film shake entailing the fluctuation of width in the resin film even when production conditions such as resin condition and operating condition change, and further preventing the film separation even in presence of a difference in the physical property between both ends and the center of the resin film.

A further object of the present invention is to provide a laminate production method and apparatus, capable of inhibiting the occurrence of craters to produce a laminate excellent in surface appearance, and in particular effective in case of a line speed rise in the production of a laminate.

In order to achieve the above-described objects, the present invention is directed to a resin film forming method for extruding fused resin from an extruder die to form a resin film, wherein a resin forming both ends in width direction of the resin film has an extension viscosity higher than that of a resin forming a center in width direction of the resin film.

Thereby, the neck-in and its accompanying film thickening of both ends of the resin film can be suppressed. The film shake that the width of the resin film fluctuates in accompaniment with the suppressing effect of the neck-in can be also suppressed.

In order to achieve the above-described objects, the present invention is also directed to a resin film forming method for extruding fused resin from an extruder die to form a resin film, wherein a resin forming both ends in width direction of the resin film has an MFR smaller than that of a resin forming a center in width direction of the resin film.

Thereby, the neck-in and its accompanying film thickening of both ends of the resin film can be suppressed. The film shake that the width of the resin film fluctuates in accompaniment with the suppressing effect of the neck-in can be also suppressed.

In order to achieve the above-described objects, the present invention is also directed to a resin film forming method for extruding fused resin from an extruder die to form a resin film, wherein a resin forming both ends in width direction of the resin film has a higher extension viscosity and smaller MFR than those of a resin forming a center in width of the resin film.

Thereby, the neck-in and the film shake can be suppressed still more.

The MFR means the number of grams representing the amount of an extruded thermoplastic resin from an orifice, 2.1 mm in diameter and 8 mm in length, for 10 min when subjected to a force of 2310 g (44 pis) at 230° C. (refer to JIS K 7210, ASTMD 1238 for the measuring method). In general, with greater resin in MFR, the fluidity and machinability in a molten state become better, but the extension strength and the like decreases.

Preferably, the resin forming both ends of the resin film joins the resin forming the center of the resin film so as to be enveloped by the later resin and is extruded from the extruder die.

Thereby, the neck-in and the film shake cannot only be suppressed still more but the film separation can also be prevented from occurrence even if both ends and the center of the resin film differ in physical property to certain extent.

In order to achieve the above-described objects, the present invention is also directed to a laminate production method for producing a laminate by nipping a running support and a resin film of thermoplastic resin by means of a nip roller and a cooling roller while coating the surface of the support with the resin film, wherein the accompanying air brought with rotation of the cooling roller to a nip point for the support and the resin film is shut off by blowing a gas permeable through the resin film toward the surface of the cooling roller.

In order to achieve the above-described objects, the present invention is also directed to a laminate production apparatus for producing a laminate by nipping a running support and a resin film of thermoplastic resin by means of a nip roller and a cooling roller while coating the surface of the support with the resin film, wherein a gas jet nozzle for jetting a gas permeable through the resin film toward the surface of the cooling roller is provided near a nip point for the support and the resin film.

According to the present invention, gas permeable through the resin film is blown from the gas jet nozzle toward the cooling roller surface to form a gas curtain so that the accompanying air flowing toward the nip point in accompaniment with the rotation of the cooling roller is shut off. Thereby, the occurrence of craters can be inhibited and a laminate excellent in surface outer appearance can be produced. In particular, even for a rise in the line speed of laminate production, the occurrence of craters can be effectively inhibited and further craters can be noticeably decreased, thus enabling the film thickness of the resin film to be also reduced.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 2(a) and 2(b) are illustrations of an extruder die, represented in a top view and a side view, respectively;

FIG. 5 is a table explaining the examples of resin film forming methods according to the present invention; and FIG. 6 is a table explaining the examples of laminate production methods according to the present invention.

DETAILED DESCRIPTION OF THE PREFERRED EMBODIMENTS

Hereunder preferred embodiments will be described in details for a resin film forming method according to the present invention in accordance with the accompanying drawings.

Figure 1:
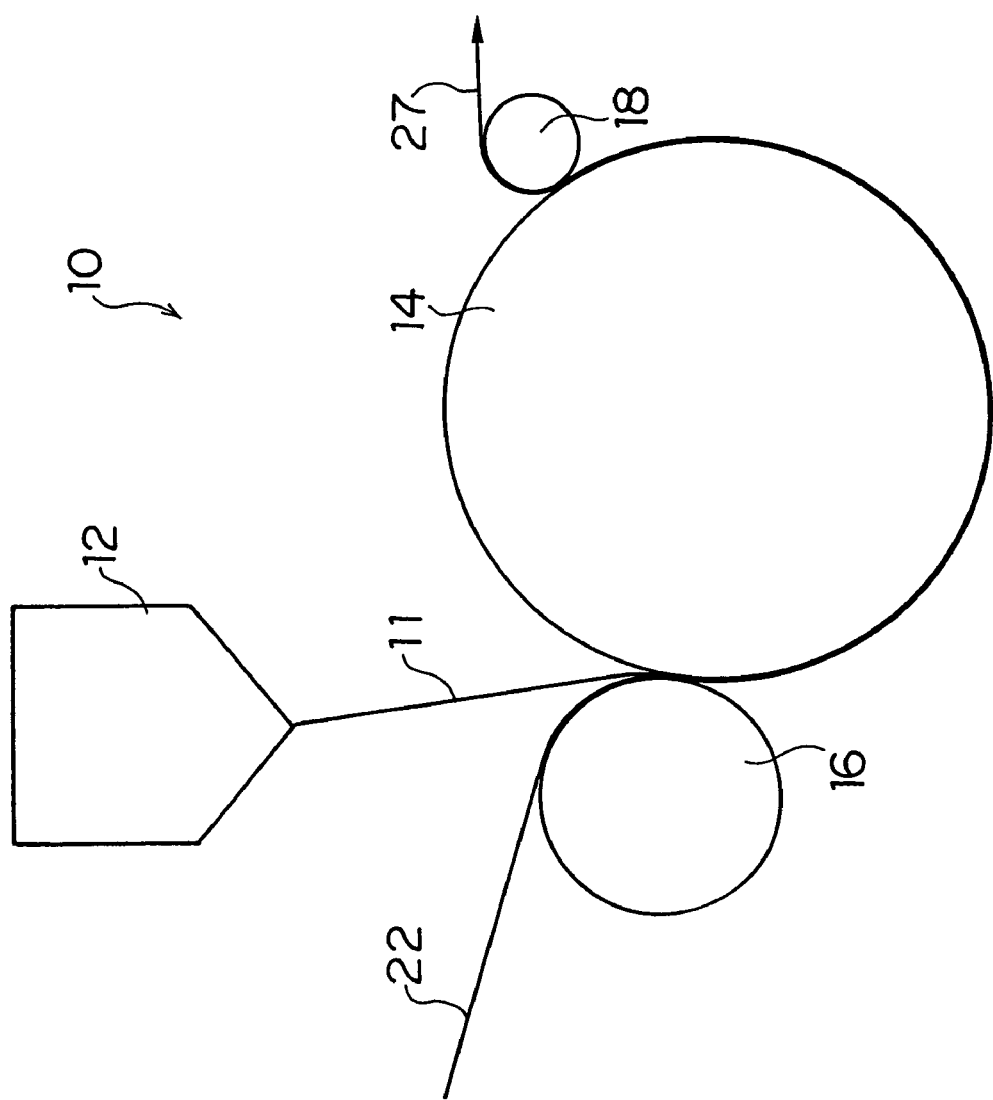
FIG. 1 is a configurational drawing of a film-shaped stack production apparatus to which a resin film forming method according to the present invention.

FIG. 1 shows a general configurational drawing showing one example of production apparatus to which a resin film forming method according to the present invention is applied and the present invention will be described referring to one example of apparatus for producing a film-shaped stack with a resin film laminated to a support.

As shown in FIG. 1, a cooling roller 14 and a nip roller 16 are disposed adjacently in parallel below an extruder die 12 for extruding a fused resin to form a resin film 11 and moreover a peeling roller 18 is disposed adjacently in parallel with the cooling roller 14 opposite the nip roller 16 with the cooling roller 14 placed therebetween. After stuck to a belt-shaped support 22 conveyed from the upstream, the resin film 11 extruded from the extruder die 12 passes between the cooling roller 14 and the nip roller 16 and between the cooling roller 14 and the peeling roller 18, runs in contact with the periphery of the cooling roller 14 and departs from the cooling roller 14 at the position of the peeling roller 18. Thereby, a film-shaped stack 27 is produced. As the support 22, paper, polyethylene or a metal can be used depending on a required film-shaped stack 27. As resins forming a resin film, publicly-known thermoplastic resins including polyolefin resin such as polyethylene or polypropylene can be used.

FIGS. 2(a) and 2(b) are schemas of an extruder die 12, represented in a front view and a side view, respectively.

As shown in FIGS. 2(a) and 2(b), the extruder die 12 chiefly comprises a manifold 28 for spreading the resin supplied into the extruder die 12 in the width direction of the extruder die 12 (in width direction of a resin film), a slit 30 for extruding a resin outward from the manifold 28 as a resin film 11, a trunk flow path 32 in which a first resin 11A forming the center in width direction of the resin film and branch flow paths 34 and 34 in which a second resin 11B forming both ends in width direction of the resin film. The first resin 11A joins the second resin 11B, both of which are extruded from slit discharge port 30A in a joined state of two resins. The first resin 11A and the second resin 11B may join together in the extruder die 12 as shown here or may join together before supplied to the extruder die 12. Thereby, the joined resin is extruded in the form of resin film 11 from the extruder die 12, and the resin film is formed of the first resin 11A at the center and formed of the second resin 11B at both ends. In this case, it is preferable as the second resin 11B to use a resin greater in extension viscosity than the first resin 11A. It is preferable as the second resin 11B to use a resin smaller in MFR than the first resin 11A. The first resin 11A is allowable to form one layer by using a single resin or to form multiple layers by using a plurality of resins and to contain an organic pigment, an additive or the like. The second resin 11B is allowable to be made of at least one kind or more of resins and to contain an additive or the like, but is preferably made of a single resin if a trimming loss (a loss due to a cutting the ear portion forming both ends of a product at the subsequent step) is considered.

Figure 3A:
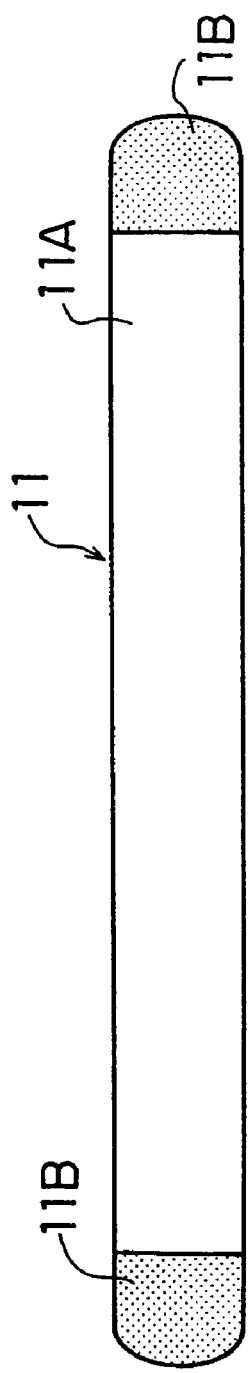
FIGS. 3(a) and 3(b) are typical views of an section in width direction of the resin film extruded from an extruder die.
Figure 3B:
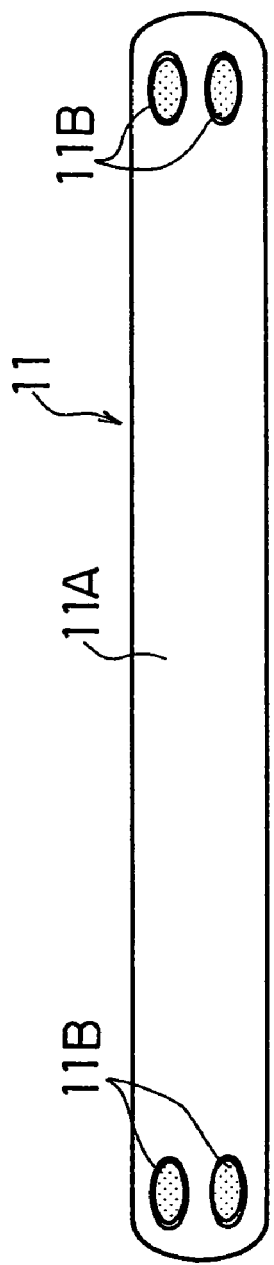

FIGS. 3(a) and 3(b) are schematic representations of a section in width direction of the resin film 11 extruded from an extruder die 12 and show a relation between a first resin 11A forming the center in width direction of the resin film and a second resin 11B forming both ends in width direction of the resin film.

FIG. 3(a) corresponds to the case where both resins are arranged so that the second resin 11B is adjacent to both ends in width direction of the first resin 11A, whereas FIG. 3(b) corresponds to the case where both resins are arranged so that the second resin 11B is enveloped in the first resin 11A. In comparison between FIG. 3(a) and FIG. 3(b), the resultant film-shaped stack can be prevented from separating from each other as a single film by arranging the second resin 11B so as to be enveloped in the first resin 11A as shown in FIG. 3(b), even if they differ in physical property to a certain extent.

FIG. 3(b) represents one example of the second resin 11B enveloped in the first resin 11A so that the second resin 11B forms two islands for each end in width direction of the first resin 11A, where one island may be arranged so as to be formed or two or more islands may be arranged so as to be formed. In order to form two islands or more, it is only necessary to make the number of branch flow paths 34 correspondent to the number of islands to which the second resin 11B is supplied.

Next, using a film-shaped stack production apparatus 10 constructed as mentioned above, a production method according to the present invention will be described.

The first resin 11A and the second resin 11B supplied to the extruder die 12 joins together in a state above the melting points of individual resins so that both resins unites with each other, the center is formed of the first resin 11A and at the same time both ends are extruded from a slit discharge port 30A as the resin film 11 formed of the second resin 11B. After oxidized with an oxidized gas such as air or ozone so that a sufficient adhesion with the support 22 conveyed from the upstream is obtained, the resin film 11 extruded from the extruder die 12 is nipped between the cooling roller 14 and the nip roller 16 and thus laminated to the support 22. Then, after cooled sufficiently by using the cooling roller 14, the resin film 11 is peeled from the cooling roller 14 by using a peeling roller 18. Thereby, a film-shaped stack 27 with a resin film 11 laminated to the support 22 is produced.

Since a resin greater in extension viscosity than the first resin 11A forming the center in width direction of the resin film is so arranged as to be used for the second resin 11B forming both ends in width direction of the resin film in forming the resin film 11 by using the extruder die 12 when this film-shaped stack 27 is produced, the neck-in can be reduced. The greater the preventive effect of neck-in is, the more effectively the film shake that the width of the resin film 11 fluctuates can be prevented. In this case, it is preferable that the ratio of the second resin 11B to the first resin 11A in extension viscosity (hereinafter, referred to as "extension viscosity ratio") is not greater than 10 at the upper limit. This is because the difference in physical property between the first resin 11A and the second resin 11B became too great if the extension viscosity ratio exceeds 10 times, which likely to mainly cause the film separation.

Causes for the neck-in are considered variously, but, in the case of producing a film-shaped stack, are attributable to a contraction in the resin film 11 caused by the presence of speed distribution in the width direction of the resin film 11, which is generated when the speed changes from the speed of winding at the cooling roller 14 to the speed of extruding from the extruder die 12. On the other hand, the degree of contraction differs depending on the viscosity of a resin. As for viscosity, there are shear viscosity and extension viscosity and ordinarily, when viscosity is simply referred to as, it points to shear viscosity, but the inventers have found that the extension viscosity has a closer relation with the degree of contraction. Thus, it is found that the neck-in can be suppressed in bounds and leaps by disposing a second resin 11B at both ends of the resin film 11 that is greater in extension viscosity than the first rein 11A forming the center in width direction of the resin film 11 and unlikely to generate the neck-in. In this case, since the extension viscosity does not necessarily increase even if the shear viscosity is raised, it is important to suppress the neck-in by managing the extension viscosity.

By using a resin smaller in MFR than the first resin 11A as the second resin 11B, the neck-in can be effectively suppressed. The greater the suppression effect against the neck-in is, the more effectively the film shake of fluctuations in the width of a resin film 11 can be prevented. In this case, it is preferable that the ratio of the second resin 11B to the first resin 11A in MFR (hereinafter, referred to as "MFR ratio") is not smaller than 1/10 at the lower limit. This is because the difference in physical property between the first resin 11A and the second resin 11B became too great if the MFR ratio is less than 1/10, which likely to mainly cause the film separation.

Furthermore, by joining the second resin 11B with the first resin 11A so as to be enveloped therein, the resultant film can be prevented from mutual separation even if the first resin 11A and the second resin 11B differ in physical property to a certain extent. In this case, since the contact area of the second resin 11B with the first resin 11A can be increased if dividing the second resin 11B into multiple parts as shown in FIG. 3(b), the film separation can be prevented effectively even in case of high speed formation of a resin film 11 or even when the second resin 11B is greater in physical property than the first resin 11A to a certain extent. If the number of dividing the second resin 11B is too great, however, the flow rate worsens in uniformity and the branch flow paths 34 becomes difficult in machinability and therefore it is advisable to set the number of divisions appropriately with consideration of a trade-off between the properties of the first resin 11A and the second resin 11B.

When a film-shaped stack with a resin film laminated onto a support 22 is produced like this embodiment, the cooling roller 14 is not sufficiently cooled and a trouble of no peeling from the cooling roller 14 is apt to occur for a thick film at both ends of the resin film, but with the present embodiment, the temperature down only at both ends of the resin film is performable and the film thickness can be decreased, so that such a trouble can be prevented.

In the present embodiment, the descriptions have been made using an example of producing a film-shaped stack with a resin film 11 laminated onto a support 22, but the present invention is also applicable to a film production process for producing a film-shaped product and to a coat process for ejecting a coat liquid in the shape of a film to coat it to a support.

Next, preferable embodiments of laminate production method and apparatus according to the present invention will be described in details.

Figure 4:
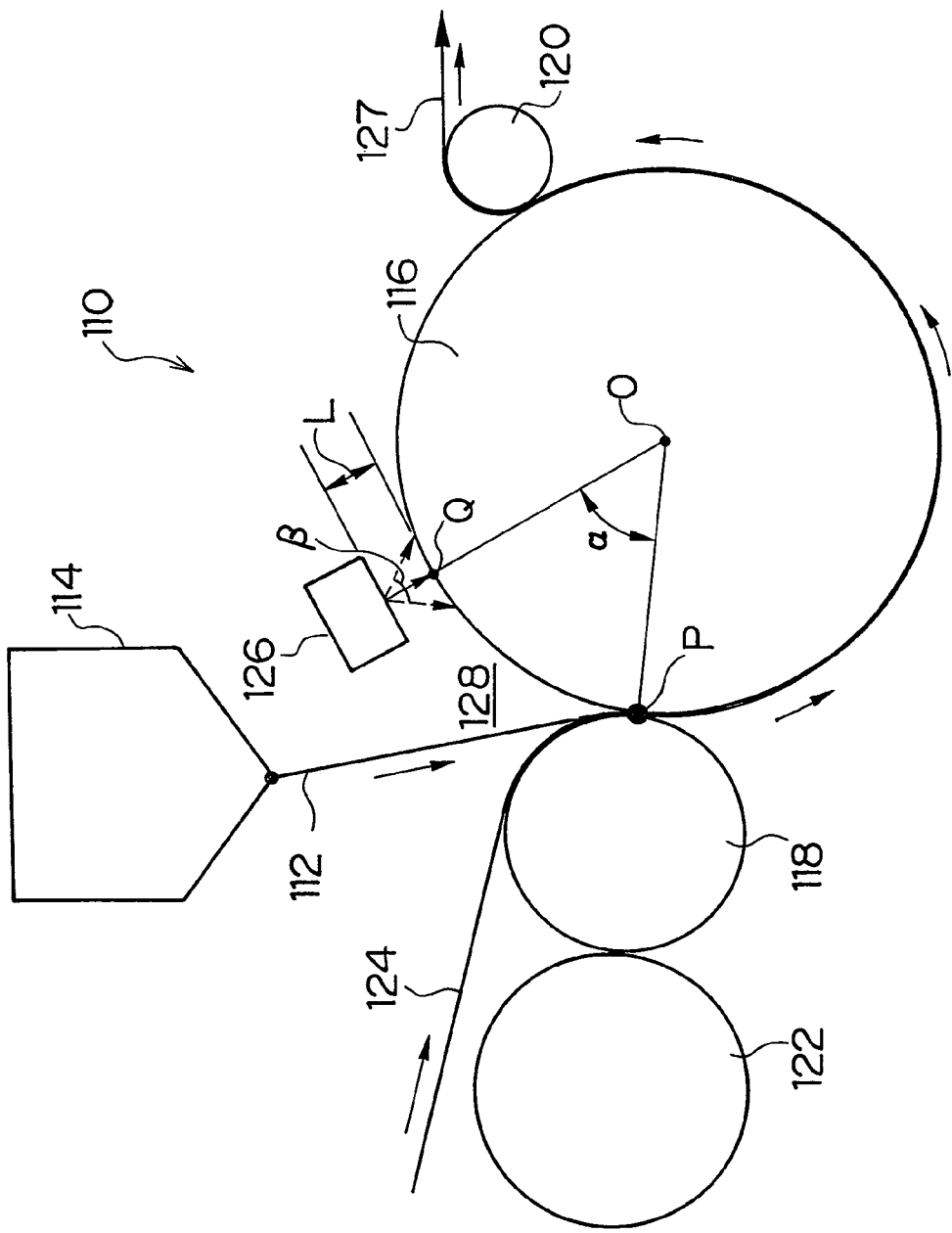
FIG. 4 is an overall configurational drawing of a laminate production apparatus according to the present invention.

FIG. 4 is a general configurational drawing of a laminate production apparatus 110 according to an embodiment of the present invention.

As shown in FIG. 4, a cooling roller 116 and a nip roller 118 are disposed adjacently in parallel below an extruder die 114 for extruding a resin film 112 of a fused thermoplastic resin and at the same time a peeling roller 120 is disposed adjacently in parallel with the cooling roller 116 opposite the nip roller 118 with the cooling roller 116 placed therebetween. Furthermore, opposite the cooling roller 116 with the nip roller 118 placed therebetween, a backup roller 122 is provided. A running belt-shaped support 124 is nipped at the nip point P where the cooling roller 116 and the nip roller 118 make contact with each other while the resin film 112 extruded from the extruder die 114 is coated. The support 124 coated with the resin film 112 runs while the resin film surface is brought into contact with the surface of the cooling roller 116, thus is cooled and is peeled from the cooling roller 116 by means of the peeling roller 120. Thereby, a laminate 127 is produced.

Near the nip point P between the support 124 and the resin film 112, a gas jet nozzle 126 for jetting a gas toward the surface of the cooling roller 116 is provided. As gases to be jetted from the gas jet nozzle 126, gases permeable through the resin film 112 such as e.g., $CO_2$ gas, $O_2$ gas, $H_2O$ gas and He gas can be used. The gas jet nozzle 126 is formed in the shape of a throttle long in width direction of the cooling roller 116 and thereby the jetted gas forms a gas curtain extending from the nozzle tip to the cooling roller surface.

According to a laminate production apparatus 110 constructed as mentioned above, a gas permeable through the resin film 112 is sprayed to the surface of the cooling roller 116 from the gas jet nozzle 126 to form a gas curtain so that the accompanying air flowing toward the nip point P in accompaniment with the rotation of the cooling roller 116 is shut off therefrom and converted into a permeable gas. Thereby, in an area 128 surrounded by the resin film 112 and the cooling roller 116, the occurrence of craters can be effectively inhibited because even the accompanying gas to the surface of the resin film 112 becomes difficult in forming a recess on the resin film 112 if permeable. Furthermore, since the accompanying air is shut off by a gas curtain, the cooling is not damaged unlike the case of using a conventional windshield plate.

Like this, the present embodiment can inhibit the occurrence of craters and enables a laminate 127 excellent in surface appearance to be produced. In particular, even in the high speed region of line speed as exceeding 300 m/min, the occurrence of craters can be effectively inhibited, thereby enabling the productivity to be raised. Furthermore, since the number of craters can be noticeably decreased, the film thickness of the resin film 112 can be also lowered, thereby enabling the cost of raw materials to be saved. Since the vicinity of the extruder die 114 is also turned into a gas atmosphere according to the present embodiment, the occurrence of a die stripe can be inhibited.

With reference to FIG. 4, a position in the vicinity of the nip point P for installing the gas jet nozzle 126 is preferably determined so that the central angle α between the line connecting the center O of the cooling roller 116 with the nip point P and the line connecting the center O with a blown point Q on the surface of the cooling roller 116 for blow from the gas jet nozzle 126, which angle represents the arc distance on the cooling roller 116 from the blown point Q to the nip point P (hereinafter, referred to as "distance from the nip point"), is 90 degrees or less, and more preferably 80 degrees or less. If the arc distance from the nip point P to the blown point Q of central angle more than 90 degrees, the blown gas diffuses and stable a gas curtain is not formed and therefore the effect decreases. The central angle for arc distance from the nip point P is still better preferably 80 degrees or smaller because the distribution is likely to occur with some gas exhaust methods or the like if exceeding 80 degrees. The blown angle β of a gas to the surface of the cooling roller 116 is within ±20° and preferably within ±10° from the central direction of the cooling roller 116 or from the direction vertical to the surface of the cooling roller 116. The distance L from the tip of the gas jet nozzle 126 to the surface of the cooling roller 116 (hereinafter, referred to as "distance from the cooling roller") is 50 mm or smaller and preferably 40 mm or smaller as the blow distance vertical to the surface of the cooling roller 116. If the distance from the cooling roller 116 exceeds 50 mm, the blown gas diffuses and stable a gas curtain is not formed and therefore the effect decreases. Furthermore, the flow velocity of the gas blown from the gas jet nozzle 126 is preferably 1 m/sec or higher and well preferably 2 n/sec. If the gas flow velocity is lower than 1 m/sec, the blown gas diffuses and stable a gas curtain is not formed and therefore the effect decreases.

These conditions of the gas jet nozzle 126 are especially effective when the line speed in producing a laminate 127 is raised to 300 m/min or higher and the rotation of the cooling roller 116 is speeded up. This is because in a manufacturing line with a very fast line speed of 300 m/min or more, the influence by the accompanying air of the cooling roller 116 increases, the shut off effect of the accompanying air is hardly obtained to a sufficient extent only by blowing a gas to the surface of the cooling roller 116 and the gas replaced once from air in the area surrounded by the resin film 112 and the cooling roller 116 diffuses completely by the turbulent diffuse.

Meanwhile, the present embodiment is effective also when a cooling roller with ruggedness on the surface is used to transfer this ruggedness to a laminate. Namely, if ruggedness is present on the surface of the cooling roller 116, the accompanying air remains in a recess; but nevertheless, by carrying out the present embodiment, the air in this recess is replaced with a permeable gas and the replaced gas permeates through the resin film, so that the ruggedness on the cooling roller surface is transferred more clearly to the resin film. Thus, even if the resin film surface is a glossy surface, a matted surface, a silky surface or the like, the quality of various surface species can be improved.

EXAMPLES

Next, specific examples of resin film forming methods according to the present invention will be described referring to FIG. 5. Resins subjected to tests were as follows. Two line speeds of 200 m/sec and 420 m/sec were used for the execution of tests.

In First Comparative Example, a mixture of fused low density polyethylene, 10 g/10 min in MFR, 1.0 in nondimensional extension viscosity and 0.917 g/cm$^3$ in density with 10 wt % of titanium oxide was extruded singly from the extruder die. In other words, the first resin alone was used and no second resin was used for the execution. The extension viscosity was measured using a rheometer and was indicated nondimensionally in this example, setting 1000 p.a.s to the representative viscosity at the time of extension viscosity of 10 (1/sec).

In Second Comparative Example, as the second resin forming both ends in width direction of a resin film, a 20 g/10 min MRF (MRF ratio: 2) resin whose extension viscosity was a third of that of the first resin forming the center in width direction of the resin film (extension viscosity ratio 1/3) was used. As one whose center was formed of the first resin and both of whose ends were of the second resin, a resin film was extruded from the slit discharge port of the extruder die. Namely, the second resin in Second Comparative Example was greater in MFR and smaller in extension viscosity than the first resin, which signified a case not satisfying the present invention. The sectional shape of a resin film when the first and second resins joined together was arranged so that the second resin was enveloped in the first as shown in FIG. 3(b).

In First Example, as the second resin forming both ends in width direction of the resin film, a 8 g/10 min MFR (MFR ratio: 2) resin whose extension viscosity was 1.2 times that of the first resin forming the center in width direction of the resin film (extension viscosity ratio 1.2) was used. As one whose center was formed of the first resin and both of whose ends were of the second resin, a resin film was extruded from the slit discharge port of the extruder die. Namely, the second resin in First Example was smaller in MFR and greater in extension viscosity than the first resin, which signified a case satisfying the present invention. The sectional shape of the resin film was the same with Second Comparative Example.

In Second Example, as the second resin forming both ends in width direction of the resin film, a 12 g/10 min MFR (MFR ratio: 1.2) resin whose extension viscosity was 1.2 times that of the first resin forming the center in width direction of the resin film (extension viscosity ratio 1.2) was used. As one whose center was formed of the first resin and both of whose ends were of the second resin, a resin film was extruded from the slit discharge port of the extruder die. Namely, the second resin in Second Example did not satisfy the present invention in MFR, but satisfied the present invention in extension viscosity. The sectional shape of the resin film was the same with Second Comparative Example.

In Third Example, as the second resin forming both ends in width direction of the resin film, a 8 g/10 min MFR (MFR ratio: 4/5) resin whose extension viscosity was 0.9 times that of the first resin forming the center in width direction of the resin film (extension viscosity ratio 0.9) was used. As one whose center was formed of the first resin and both of whose ends were of the second resin, a resin film was extruded from the slit discharge port of the extruder die. Namely, the second resin in Third Example satisfied the present invention in MFR, but did not satisfy the present invention in extension viscosity. The sectional shape of the resin film was the same with Second Comparative Example.

In Fourth Example, as the second resin forming both ends in width direction of the resin film, a 1.0 g/10 min MFR (MFR ratio: 1/10) resin whose extension viscosity was 10 times that of the first resin forming the center in width direction of the resin film (extension viscosity ratio 10) was used. As one whose center was formed of the first resin and both of whose ends were of the second resin, a resin film was extruded from the slit discharge port of the extruder die. Namely, the second resin in Fourth Example was noticeably smaller in MFR and noticeably greater in extension viscosity than the first resin, which signified a case satisfying the present invention. The sectional shape of the resin film was the same with Second Comparative Example.

In Third Comparative Example, the sectional shape of a resin film when the first and second resins joined together was arranged so as to adjoin each other as shown in FIG. 3(a) and the other points were the same with Fourth Example.

Regarding First to Fourth Examples and First to Third Comparative Examples, the neck-in amount at one side of a resin film (L in FIG. 2(a)) and the presence of film separation between the center and both ends of a resin film were compared.

As understood from the comparison between First and Second Comparative Examples and First to Fourth Examples in FIG. 5, the neck-in amount could be decreased if either MFR or extension viscosity satisfied the present invention, i.e. by setting the MFR ratio below 1 or the extension viscosity above 1.

When MFR did not satisfy the present invention and extension viscosity satisfied the present invention in the second resin like Second Example or when MFR satisfied the present invention and extension viscosity did not satisfy the present invention in the second resin like Third Example, or even when either MFR or extension viscosity satisfied, the neck-in amount could be decreased but the decreasing effect of the neck-in amount was smaller than in First Example and Fourth Example which satisfy both of them.

Even if the line speed was so great as 420 (m/min), the first resin and the second resin could be prevented from film separation and the suppressive effect against the neck-in could be maintained by arranging the second resin so as to be enveloped in the first resin when the first resin forming the center in width direction of the resin film and the second resin forming both ends in width direction of the resin film joined together like Fourth Example. In contrast, when the first and second resins were joined together so as to adjoin each other like Third Comparative Example, the film separation occurred and measuring the neck-in amount was impossible.

No estimation of film shake was described in FIG. 5, but the film shake was small with smaller neck-in amount. From this, it followed that suppressing the neck-in enabled the film shake to be suppressed.

When the first and second resins were joined together so as to adjoin each other as shown in FIG. 3(a), the setting temperature of both ends in width direction of the extruder die (corresponding to both ends in width direction of the resin film) was lowered by 40° C. from that in the test of FIG. 5 and the other conditions were made identical with those of First Example for the execution with the result that a similar neck-in effect was obtained and also no film separation occurred. Namely, by lowering the resin film temperature at both ends and raising the viscosity already at the time point when the resin film was extruded from the extruder die, the film separation could be prevented even when the first and second resins were joined together so as to adjoin each other as shown in FIG. 3(a).

Next, specific examples of laminate production methods and apparatuses according to the present invention will be described referring to FIG. 6. In the following examples and comparative examples, 25 μm thick polyethylene was laminated on the surface of a 175 μm thick and 300 mm wide belt-shaped support (original paper). As line speeds, tests were made at a high speed of 300 m/min and a still higher speed of 400 m/min in two ways.

Fifth Example was made by blowing the $CO_2$ gas from a gas jet nozzle at a line speed of 300 m/min toward a cooling roller direction (in FIG. 6, simply described as "roller surface") and by the wind velocity of $CO_2$ gas to 3 m/sec (wind amount: 36 lit./min), the distance from the nip point to 45 degrees and the distance from the cooling roller to 20 mm so as to satisfy all the conditions of the present invention.

Sixth Example was the same as Fifth Example except by setting the line speed to 400 m/min.

Fourth Comparative Example was a case of setting the line speed to 300 m/min without a gas jet nozzle provided.

Fifth Comparative Example was made by blowing the gas from a gas jet nozzle to the nip point at a line speed of 300 m/min as described in Japanese Patent Application Publication No. 63-246227 and the other conditions than this were set as with Fifth Example so that only the blowing direction of a gas did not satisfy the present invention.

Sixth Comparative Example was made like Fifth Example except by setting the distance from a cooling roller to 60 mm, so that only the distance from the cooling roller did not satisfy the present invention.

Seventh Comparative Example was made like Fifth Example except by setting the distance from a nip point to 100 degrees, so that only the distance from the nip point did not satisfy the present invention.

Eighth Comparative Example was made like Fifth Example except by setting the wind speed of $CO_2$ gas to 0.5 n/sec, so that only the distance from the nip point did not satisfy the present invention.

Ninth Comparative Example was made like Fifth Comparative Example except by setting the line speed to 400 m/min.

Tenth Comparative Example was made like Ninth Comparative Example except by installing a windshield plate made of urethane rubber at the upstream position of a gas jet nozzle in the flow direction of the accompanying air.

The laminates produced under conditions of the above Examples and Comparative Examples were estimated by measuring the number of craters per 1 $cm^2$ of a resin film. The estimated results are shown in FIG. 6 as "Crater Result".

In contrast to Fourth Comparative Example in which the number of craters was as extremely great as 350 owing to the provision of no gas jet nozzle, as understood from FIG. 6, the number of craters was decreased to 100 for Fifth Comparative Example in which a gas was blown toward the nip point. The number of craters for Fifth Example in which a gas was blown toward the surface of a cooling roller was noticeably decreased to 40. Namely, though even the gas blowing toward the nip was effective in the suppression of craters, the effect could be still more improved by the gas blowing toward the surface of the cooling roller. This signified that a curtain of gas was formed by blowing a gas toward the surface of the cooling roller and the shut off of the accompanying air brought with the rotation of the cooling roller thereby was noticeably effective in the suppression of the occurrence of craters.

As understood from the comparison between the number of craters equal to 40 for Fifth Example and the number of craters equal to 200 for Sixth Comparative Example in which only the distance from a cooling roller did not satisfy the present invention, the suppressive effect became small unless the gas blowing position was brought close to the cooling roller surface and specifically the gas blowing position was preferably 50 mm or smaller from the cooling roller surface.

As understood from the comparison between the number of craters equal to 40 for Fifth Example and the number of craters equal to 210 for Seventh Comparative Example in which only the distance from a nip point did not satisfy the present invention, the suppressive effect became small unless the distance from the nip point was taken short and specifically the distance from the nip point was preferably 90 degrees or smaller.

As understood from the comparison between the number of craters equal to 40 for Fifth Example and the number of craters equal to 190 for Eighth Comparative Example in which only the gas wind velocity did not satisfy the present invention, the suppressive effect became small unless the gas wind velocity was taken great and specifically the gas wind velocity was preferably 1 m/sec or greater. In this case, in order to decrease the number of craters so as to become equal to that of Fifth Example under the gas wind velocity condition of Eighth Comparative Example, the thickness of polyethylene to be laminated had to increase to 35 Ξm.

From comparison between Fifth Comparative Example and Ninth Comparative Example, it followed that the number of craters drastically increased from 100 to 250 according as the line speed rose from 300 m/min to 400 m/min under other similar conditions, but also in this case, as understood from Sixth Example, the number of craters could be decreased to 50 by directing the gas blow toward the cooling roller surface to form a gas curtain.

From comparison between Ninth Comparative Example and Tenth Comparative Example, it followed that the number of craters could be decreased from 250 to 115 by the provision of a windshield plate, but even in this case could be decreased to 40, equal to the number of craters at Sixth Example. In case of a windshield plate installed, sticking of a different matter between the windshield plate and the cooling roller led to the occurrence of fine stripes on the cooling roller and in an extreme case, the surface treatment of the cooling roller had to be done over again.

With a resin film forming method according to the present invention, as described heretofore, the neck-in or the resultant thickening of both ends in a resin film can be suppressed and the film shake of a change in width of a resin film can be also suppressed even if the production conditions such as resin condition and operating condition change and further the film separation can be prevented even if both ends and the center of a resin film differ in physical property.

Thereby, a problem that the film thickness in both ends of a resin film increases in accompaniment with the neck-in and a problem due to the film separation can be solved and further the material loss can be reduced.

Since the speedup of line can be made possible according to the present invention, the production efficiency can be improved to a great extent.

With a laminate production method and apparatus according to the present invention, the occurrence of craters can be inhibited and a laminate excellent in surface appearance can be produced. In particular, even in such a high speed region that the line speed exceeds 300 m/min, the occurrence of craters can be noticeably inhibited, so that the productivity can be improved. Furthermore, since the number of craters can be noticeably decreased, the film thickness of a resin film can be also reduced, thereby enabling the expense of raw materials to be saved.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A laminate production apparatus for producing a laminate by nipping a running support and a resin film of thermoplastic resin by means of a nip roller and a cooling roller while coating the surface of the support with the resin film, and comprising a gas jet nozzle for jetting a gas toward the surface of the cooling roller and forming a gas curtain extending in a width direction of the surface of the cooling roller, between the cooling roller and the gas jet nozzle, wherein the gas jet nozzle is disposed at a position corresponding to a central angle for the cooling roller of 90 degrees or smaller, the central angle representing an arc distance on the cooling roller from a blown point on the surface of the cooling roller for gas blow to the nip point wherein the gas jet nozzle is perpendicular to the surface of the cooler roller, and wherein the gas jet nozzle jets the gas from a gas source, the gas being permeable through the resin film.

2. The laminate production apparatus according to claim 1, wherein a flow velocity of the gas blown from the gas jet nozzle is 1 m/sec or higher.

3. The laminate production apparatus according to claim 1, wherein the gas jet nozzle is disposed at a position such that the distance from a tip of the gas jet nozzle to the surface of the cooling roller is 50 mm or shorter when blowing the gas vertically to the surface of the cooling roller.

4. The laminate production apparatus according to claim 3, wherein a flow velocity of the gas blown from the gas jet nozzle is 1 m/sec or higher.

5. The laminate production apparatus according to claim 1, wherein a flow velocity of the gas blown from the gas jet nozzle is 1 m/sec or higher.

6. The laminate production apparatus according to claim 1, wherein the gas jet nozzle is disposed at a position such that the distance from a tip of the gas jet nozzle to the surface of the cooling roller is 50 mm or shorter when blowing the gas vertically to the surface of the cooling roller.

7. The laminate production apparatus according to claim 6, wherein a flow velocity of the gas blown from the gas jet nozzle is 1 m/sec or higher.

* * * * *